Sept. 19, 1950     W. A. BEDFORD, JR     2,523,185
FASTENER CLIP
Filed June 2, 1949
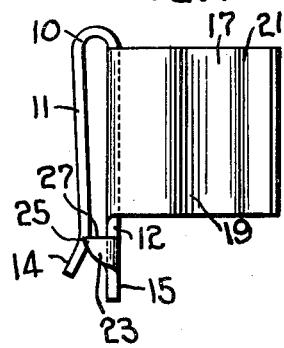
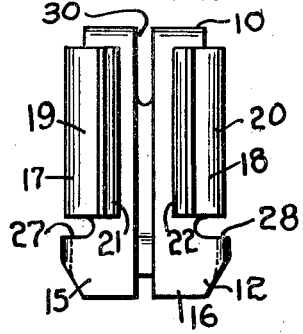
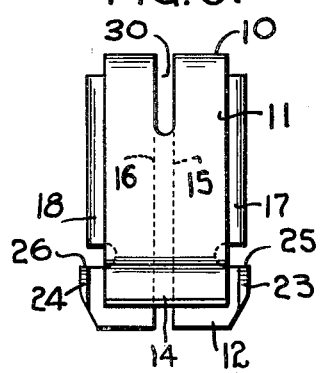
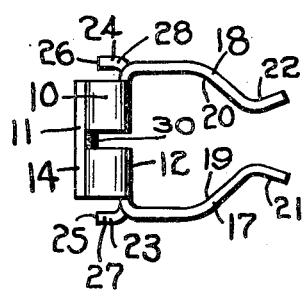
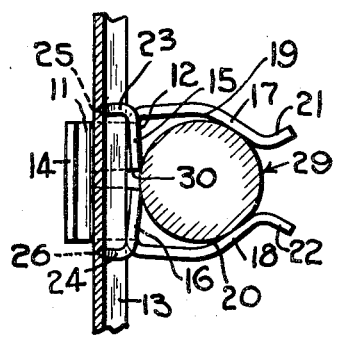
INVENTOR:
WILLIAM A. BEDFORD JR
BY Philip E. Parker
ATTORNEY.

Patented Sept. 19, 1950

2,523,185

UNITED STATES PATENT OFFICE 2,523,185

FASTENER CLIP

William A. Bedford, Jr., North Scituate, Mass., assignor to United Carr Fastener Corporation, Cambridge, Mass., a corporation of Massachusetts Application June 2, 1949, Serial No. 96,657

7 Claims. (Cl. 24—81)

The present invention relates to fastener clips such as those intended for attaching cables, tubing, conductors and like articles or objects to a supporting structure, and aims generally to improve existing devices of this type.

A primary object of the invention is the provision of a fastener clip for securing cylindrical and like shaped articles to a support wherein the insertion of the article to be secured increases the gripping action of the clip on the support.

Another object of the invention is the provision of a fastener clip for cables, conductors and the like having novel support-engaging and gripping means adapted to be attached to a support and to grip the support more tightly when a cable, conductor or the like is positioned therein.

Still another object of the invention is the provision of a fastener clip for securing articles to a support which is simple in construction, economical to manufacture, and easy to apply.

These and other objects and advantages of the invention will be apparent to persons skilled in the art from a consideration of the attached drawings and annexed specification illustrating and describing a perferred embodiment of the invention.

In the drawings:

Fig. 1 is a side elevational view of the fastener clip of this invention;

Fig. 2 is a front elevational view thereof;

Fig. 3 is a rear elevational view thereof;

Fig. 4 is a top view; and

Fig. 5 is a bottom view of the fastener clip applied to a support and illustrating the increased gripping action when an article is positioned therein.

Referring to the drawings, the improved fastener clip is advantageously made from a single strip of resilient sheet material, for example, spring steel, reversely bent upon itself to form a substantially U-shaped clip having a central bight portion 10 and opposed leg portions 11 and 12 adapted to be positioned on opposite sides of a support 13 to which the clip is to be attached. The central bight portion 10 is preferably of a diameter somewhat greater than the thickness of the thickest support 13 to be engaged and the legs 11 and 12 extend tangentially therefrom in slightly converging relationship, the terminal end of the leg 11 being flared outwardly as at 14 to facilitate slipping the clip over an edge of the support 13.

The leg 12 is bifurcated throughout its length forming spaced leg portions 15 and 16 which are normally disposed in substantially parallel relationship to the leg 11 as shown in Figs. 1 and 4, but which may be biased or twisted around the longitudinal axes thereof to the angularly inclined positions shown in Fig. 5. Extending laterally from opposite outer edges of the bifurcated leg portions 15 and 16 are wings 17 and 18 which provide opposed extensions constituting an article-receiving clip. The wings 17 and 18 are desirably formed with inwardly curved portions 19 and 20 to assist in retaining an article therebetween, and outwardly curved ends 21 and 22 to assist in positioning an article therein.

Also extending laterally from the outer edges of the bifurcated leg portions 15 and 16 but in a direction opposite the wings 17 and 18 are a pair of support-engaging teeth 23 and 24. These are designed to grip the material of the support and prevent accidental dislodgment of the clip therefrom due to vibration and the like. The teeth 23 and 24 may take any desirable form suitable for gripping the support but are preferably shaped so as to provide relatively sharp terminal points or edges 25 and 26. The side edges 27 and 28 of the teeth which face the bight portion 10 may desirably be arranged substantially at right angles to the plane of the leg portion 12 to assist in preventing accidental displacement of the clip from a support.

An important feature of the present invention is the increased gripping action obtained when an article to be held is positioned in the clip between the wings 17 and 18. Thus, as will be apparent from Fig. 5, an article 29 positioned between the wings 17 and 18 spreads them apart thereby biasing or twisting the bifurcated leg portions 15 and 16 about their longitudinal axes to cause the teeth 23 and 24 to move inwardly toward the opposite leg 11 of the clip and bite into the supporting material 13. Hence, as long as the article 29 is positioned between the wings 17 and 18, the clip tightly engages the support 13 and is positively held thereon against accidental displacement. When the clip is to be removed from the support it is usually desirable to first remove the article 29 from between the wings 17 and 18 to thereby decrease the gripping action. The clip may then be relatively easily removed by sliding it off the support.

The increased gripping action obtainable by the clip of this invention when an article is positioned between the wings 17 and 18 is made possible by the bifurcated leg portions 15 and 16. This bifurcation extends throughout a substantial portion of the length of the leg 12 of the clip and preferably throughout the full length of the leg 12 and for a short distance into the leg 11 as shown by the numeral 30. This permits ready biasing of the bifurcated leg portions 15 and 16 with consequent increased gripping action as described.

Various modifications of the invention described and illustrated will most likely occur to those skilled in the art to which the invention relates and may be made without departing from the spirit of the invention, the scope of which is indicated in the attached claims.

I claim:

1. A fastener clip adapted to secure articles such as conductors and the like to a support comprising a sheet of resilient material reversely bent upon itself to form a substantially U-shaped member having oppositely disposed leg portions adapted to be positioned on opposite sides of a support interposed therebetween, one of said leg portions being bifurcated throughout a substantial portion of its length to form bifurcated leg portions, wing members extending laterally from said bifurcated leg portions and forming an article-receiving clip, and support-engaging teeth extending laterally from said bifurcated leg portions in a direction opposite said wings and adapted to be urged into a support when an article is positioned in said article-holding clip.

2. A fastener clip adapted to secure articles such as conductors and the like to a support comprising a strip of resilient sheet metal having an intermediate bight portion and oppositely disposed legs adapted to be positioned on opposite sides of a support interposed therebetween, one of said legs being bifurcated to form spaced leg portions, wing members extending laterally from the outer edges of said leg portions to form an article-receiving clip, and support-engaging teeth extending laterally from said bifurcated leg portions in a direction opposite said wings and adapted to be urged into a supporting material interposed between said legs when an article is positioned between said wings.

3. A fastener clip for securing articles to a support comprising a U-shaped member having oppositely disposed legs adapted to be positioned on opposite sides of a support interposed therebetween, one of said legs being bifurcated to form spaced leg portions, support-engaging teeth extending laterally from adjacent the outer edges of said spaced leg portions into the space between said legs, and wing members extending laterally from said spaced leg portions in a direction opposite said spaced teeth to form an article-engaging clip, said wing members being spread apart when an article is positioned therebetween, thereby biasing said leg portions to cause said teeth to bite into a support interposed between said legs.

4. A fastener clip for securing articles to a support comprising a U-shaped member having oppositely disposed legs adapted to be positioned on opposite sides of a support interposed therebetween, one of said legs being bifurcated throughout its length to form spaced leg portions, support-engaging teeth extending laterally from adjacent the outer edges of said spaced leg portions into the space between said legs, and wing members extending laterally from the outer edge portions of said spaced leg portions in a direction opposite said spaced teeth to form an article-engaging clip, said wing members being spread apart when an article is positioned therebetween thereby biasing said leg portions to cause said teeth to bite into a support interposed between said legs.

5. A fastener clip for securing articles to a support comprising a U-shaped member having oppositely disposed legs adapted to be positioned on opposite sides of a support interposed therebetween, one of said legs being bifurcated throughout its length to form spaced leg portions, said bifurcation extending into the other leg, a pair of support-engaging teeth extending laterally from the outer edges of said leg portions into the space between said legs, and wing members extending laterally from the outer edges of said leg portions in a direction opposite said teeth, said wing members being biased apart when an article is positioned therebetween thereby twisting said leg portions about their longitudinal axes to cause said teeth to bite into a supporting material interposed between said legs.

6. A fastener clip as set forth in claim 5 in which said wings are provided with inwardly curved portions spaced from said leg portions to retain an article therebetween.

7. A fastener clip as set forth in claim 6 in which the terminal portions of said wings are flared outwardly to facilitate entry of an article therebetween.

WILLIAM A. BEDFORD, Jr.

No references cited.